US012619806B2

(12) United States Patent (10) Patent No.: US 12,619,806 B2
Yavas et al. (45) Date of Patent: May 5, 2026

(54) OPTIMIZATION SYSTEM

(71) Applicant: TUSAS—TURK HAVACILIK VE UZAY SANAYII ANONIM SIRKETI, Ankara (TR)

(72) Inventors: Hakan Yavas, Ankara (TR); Ahmet Alptug Tanrikulu, Ankara (TR); Akin Dagkolu, Ankara (TR); Istemihan Gokdag, Ankara (TR)

(73) Assignee: TUSAS- TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 843 days.

(21) Appl. No.: 17/925,079

(22) PCT Filed: Mar. 29, 2021

(86) PCT No.: PCT/TR2021/050274
§ 371 (c)(1),
(2) Date: Nov. 14, 2022

(87) PCT Pub. No.: WO2021/236042
PCT Pub. Date: Nov. 25, 2021

(65) Prior Publication Data
US 2023/0342525 A1 Oct. 26, 2023

(30) Foreign Application Priority Data
May 22, 2020 (TR) ................................. 2020/08028

(51) Int. Cl.
*G06F 30/27* (2020.01)
*G06F 113/10* (2020.01)
(Continued)

(52) U.S. Cl.
CPC .......... *G06F 30/27* (2020.01); *G06F 2113/10* (2020.01); *G06F 2119/08* (2020.01); *G06F 2119/14* (2020.01); *G06F 2119/18* (2020.01)

(58) Field of Classification Search
CPC .......... G06F 30/27; G06F 30/20; G06F 30/25; G06F 30/28; G06F 2111/00–2119/22;
(Continued)

(56) References Cited

U.S. PATENT DOCUMENTS 10,216,172 B2  2/2019  Arisoy et al.
10,384,416 B2  8/2019  Cheung et al.
(Continued)

FOREIGN PATENT DOCUMENTS

WO  2018054502 A1  3/2018

OTHER PUBLICATIONS

International Search Report and Written Opinion for PCT/TR2021/050274 dated Oct. 8, 2021.
(Continued)

*Primary Examiner* — Rehana Perveen
*Assistant Examiner* — Troy A Maust
(74) *Attorney, Agent, or Firm* — Notaro, Michalos & Zaccaria P.C.

(57) ABSTRACT

A device that enables the production of a part by additive manufacturing and a digital model that enables part analysis and/or design to be made in a virtual environment and creates a three-dimensional virtual part model are disclosed. A processor unit enables the designing of the digital model. Multiple unit design cells are used as building blocks to create the digital model that are virtually designed in the processor unit and that each have a three-dimensional platonic geometric shape. At least one database is provided in which analysis and/or design data are stored.

9 Claims, 2 Drawing Sheets

(51) Int. Cl.
  *G06F 119/08* (2020.01)
  *G06F 119/14* (2020.01)
  *G06F 119/18* (2020.01)
(58) Field of Classification Search
  CPC .......... Y02P 10/25; B22F 10/36; B22F 10/28;
        B22F 10/80; B22F 10/85; B33Y 50/02;
      B33Y 10/00; B33Y 50/00; B29C 64/153;
                      B29C 64/386
  See application file for complete search history.

(56)                References Cited

U.S. PATENT DOCUMENTS

2016/0207111 A1 * 7/2016 Robrecht ........... B29D 99/0089
2020/0242496 A1 * 7/2020 Salasoo .................... G06N 7/00
2024/0024953 A1 * 1/2024 Buller .................... B22F 10/85

OTHER PUBLICATIONS

International Application Status Report received Apr. 20, 2021.
Written Opinion of the International Preliminary Examining Author-
ity dated May 31, 2022.
Response to Written Opinion of May 31, 2022 for PCT/TR2021/
050274 dated Jul. 27, 2022.
Written Opinion of the International Preliminary Examining Author-
ity dated Sep. 1, 2022.
Response to Written Opinion of Sep. 1, 2022 for PCT/TR2021/
050274 dated Sep. 28, 2022.
International Preliminary Report on Patentability for PCT/TR2021/
050274 dated Oct. 28, 2022.

* cited by examiner

OPTIMIZATION SYSTEM

This invention relates to an optimization system developed to make design-improvements in designing a digital model to be produced using additive manufacturing.

With the development of technology, the use of complex-shaped parts has become widespread, particularly in the aviation industry. In order to produce such parts, additive manufacturing technologies have been developed, with ongoing process improvement studies, that enable the production of three-dimensional parts by depositing metal, ceramic and polymer material powders or filaments layer-by-layer on top of each other and processing and subjecting the same to heat treatment using a printer head. Nowadays, digital model designs and analysis are generally shaped according to the capabilities of traditional part production methods such as machining technologies. For this reason, the digital model designing of parts to be produced can be performed in a limited design space and in a small number of processing aspects. However, together with the development of additive manufacturing technologies, the design space has expanded and it has become possible to produce geometries such as cage structures and internally-channeled designs that cannot be produced using machining technologies. In this way, it has become possible to reach lightweight values that are almost impossible to reach with traditional methods, as well as to control the local mechanical properties. However, there is a need for methods and/or methodologies for the integration of said parts with complex geometries into digital model geometries calculated and developed for traditional production technologies. Studies on digital model designing on additive manufacturing production have been continuing.

In the European patent application document EP3051445A1, which forms part of the state of the art, it is mentioned on computer-generated digital modeling for parts to be produced by additive manufacturing and on the ability of carrying out structural analysis of these models using finite element analysis. In the aforementioned method, the use of finite element analysis as an intermediate step and thus the production of three-dimensional digital models through accurate calculations are described.

The United States patent application document US20160207111A1, which forms part of the state of the art, relates to a method comprising the addition of material on material so that parts or objects to be produced by additive manufacturing acquire their required physical properties during their production. The objects there consist of geometric shapes such as an uncut octahedron, a dodecahedron, an icosahedron, an icosidodecahedron.

In the U.S. patent Ser. No. 10/303,157B2, which forms part of the state of the art, a method is described wherein the parts that can be produced by additive manufacturing can be sliced by their x, y and z planes and their three-dimensional digital models can be created on a computer in a virtual manner.

In the European patent application document EP3045300A1, which forms part of the state of the art, it is described that hollow polyhedron geometries can be used as unit geometries in designing.

The use of unit design cells with platonic geometric shapes during the digital model designing of a part to be produced by additive manufacturing and the conversion of the physical, chemical, geometric and mechanical analysis of these unit design cells from a micro level to a macro level and then transformation into a global analysis are known from the prior art. However, this process is done by the user for each production. This, in turn, leads to a loss of time and work.

By virtue of the optimization system developed with this invention, costs and time will be saved by enabling the integration of finite element analysis programs which have been applied to traditional methods into additive manufacturing applications by virtue of minimizing the geometric, physical, mechanical and chemical differences between a part produced by additive manufacturing and its digital model designed on a drawing program.

Another object of the invention is to minimize the physical geometric and mechanical differences between a product and its designed form that may occur due to shifts and errors caused by the production process when internally-channeled shapes and complex-geometry shapes digitally modeled in the design phase are easily transferred to the product.

Another object of the invention is to enable the traditional modeling methods to be effectively applied also to parts that are to be produced by additive manufacturing and to make this process a systematic one.

Another object of the invention is to enable local improvements to be made during the designing and digital modeling of an internally-channeled part with a complex geometry, which is to be produced by additive manufacturing, and to enable the production thereof in a more light-weight structure.

The optimization system realized to achieve the object of the invention and defined in the first claim and in the claims dependent thereon comprises a device that enables the production of three-dimensional parts by additive manufacturing, a digital model in which a part to be produced in the body is designed and modeled in a virtual environment, a processor unit by which the digital model is designed, multiple unit design cells that can be designed virtually in the processor unit, used as building blocks to create the digital model and consist of three-dimensional platonic geometric shapes, at least one database in which analysis and/or design data relating to the digital model and to the unit design cells that make it up are stored.

The optimization system according to the present invention comprises a database where the test data of each of more than one part produced in the device and subjected to chemical and/or physical tests are stored and a processor unit that enables the generation of a digital model by organizing the unit design cells according to the test data obtained from the database.

In an embodiment of the invention the optimization system comprises a device that is under the control of the processor unit and that conducts the production of parts according to the commands from the processor unit.

In an embodiment of the invention, the optimization system comprises a processor unit that determines the mechanical, geometric, physical and chemical tests which the user will apply to the part in order to perform analysis.

In an embodiment of the invention the optimization system comprises a processor unit that enables the determination of the platonic geometric shape of the unit design cell in accordance with the data extracted from the database.

In an embodiment of the invention, the optimization system comprises a processor unit that is used to identify the difference between the results of the data obtained as a result of physical and mechanical tests applied to the part produced by the user in the body and the results of the numerical analysis to which the digital model is subjected virtually, and to create a digital model by machine learning in order to reduce these identified differences.

In an embodiment of the invention, the optimization system comprises a processor unit that compares the results of chemical, physical, geometric and mechanical tests of the part previously loaded in the database with the analysis data of each unit design cell and that enables a digital model to be obtained by making the selection and arrangement of unit design cells by means of machine learning method.

In an embodiment of the invention the optimization system comprises a processor unit that can be programmed with the design program so as to allow the user to create a digital model thereon.

In an embodiment of the invention, the optimization system comprises a unit design cell consisting of at least one of solid platonic geometric shape with cubic, tetrahedral, octahedral, dodecahedral and icosahedron three-dimensional geometric shapes.

In an embodiment of the invention, the optimization system includes a processor system that provides optimization by analyzing with simulations the mechanical and thermal stresses to be applied to the digital model designed by numerical analysis, determining the regions where the stress does not reach the transport threshold value determined by the user according to the data obtained from stress and pressure distributions, and removing the unit design cells out of these regions.

In an embodiment of the present invention, the optimization system comprises a processor unit that determines at least one of the additive manufacturing production parameters such as powder melting parameters, laser directing angle, laser power, electron gun power or beam directions, which are used by the device to properly produce the part.

In an embodiment of the invention the optimization system comprises a processor unit which is located on the device and enables the production of the device to be controlled.

The optimization system realized to achieve the object of the present invention is shown in the attached figures, wherein from these FIGS.

The parts in the figures are individually numbered and the equivalents of these numbers are given below.

Figure 1:
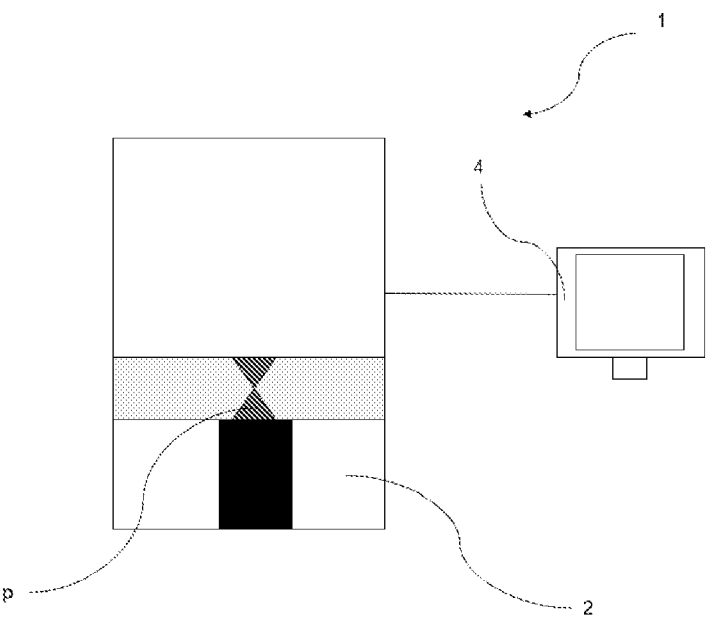
FIG. 1 is a schematic view of an optimization system.

1—Optimization System
2—Device
3—Digital Model
4—Processor unit
5—Unit Design Cell
6—Database
p—Part The optimization system (1) comprises a device (2) that allows the production of parts (p) by additive manufacturing, a digital model (3) by which a part (p) to be produced within the device (2) is 3D-drawn and modeled, analyzed and/or designed in a virtual environment, a processor unit (4) that enables the 3D-designing of the digital model (3), multiple unit design cells (5) that are used as building blocks to create the digital model (3) in a way that the digital model (3) can be created in the most proper and optimized manner and that consist of three-dimensional platonic geometric shapes virtually designed in the processor unit (4), at least one database (6) in which design and manufacturing algorithms for the digital model (3) and unit design cells (5) are stored. (FIG. 1)

Figure 2:
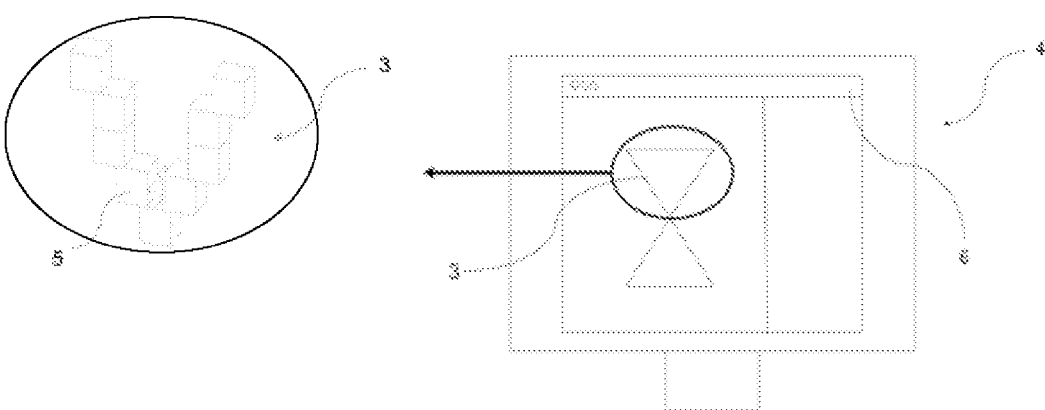
FIG. 2 is a schematic view of a processor unit.

The optimization system (1) according to the present invention comprises a database (6) in which are stored the test data obtained by subjecting multiple parts (p) produced in the device (2) to chemical, physical, geometric and mechanical tests, and a processor unit (4) that enables the final and optimized version of the digital model (3) to be created by making changes in the arrangement of unit design cells (5) using these test data obtained from the database (6). (FIG. 2)

In an embodiment of the invention, the processor unit (4) enables the production of part (p) by co-operating with the device (2) that enables part (p) production under the control of the processor unit.

In an embodiment of the invention, the processor unit (4) enables the determination of the chemical, physical, mechanical and geometric tests required to be applied to the part (p).

In an embodiment of the invention, the processor unit (4) determines the platonic geometric shape of the unit design cells (5) used as building blocks to create the digital model (3) according to the information it receives from the database (6).

In an embodiment of the invention, the user can identify the differences obtained as a result of the analyzes applied to the digital model (3) to the results of the chemical, physical, geometric and mechanical tests applied by the user to the previously produced part (p) and enable the digital model (3) to be created by means of machine learning according to these differences.

In an embodiment of the invention, the processor unit (4) enables the analysis data applied to each unit design cell (5) to be compared with the chemical, physical, geometric and mechanical test data of the part (p) in the database (6) and by making use of machine learning accordingly, enables the creation of the digital model (3) by making the selection and arrangement of unit design cells (5) forming the digital model (3).

In an embodiment of the invention, the processor unit (4) can be programmed appropriately for designing, modeling and analyzing to enable the part (p) to be designed.

Figure 3:
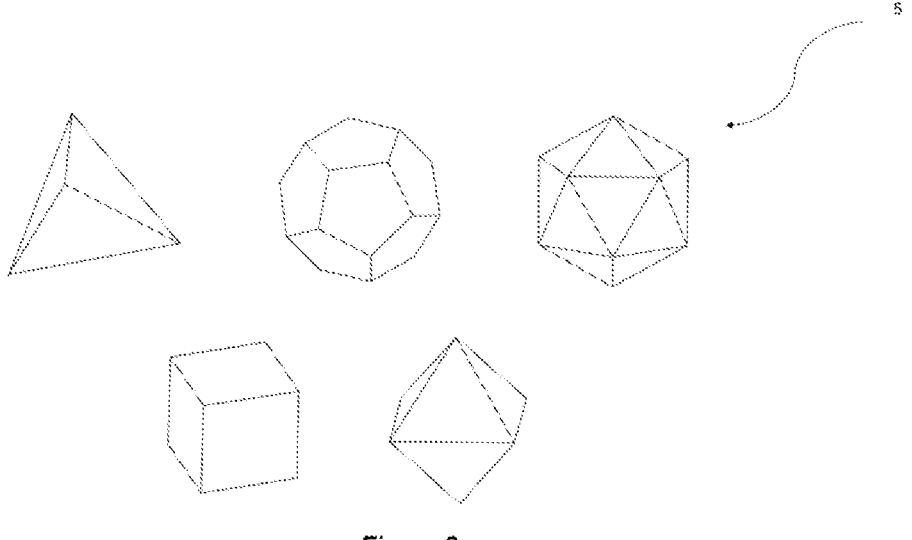
FIG. 3 is a schematic view of unit design cells.

In an embodiment of the invention, the optimization system (1) is composed of at least one of solid platonic geometric shapes comprising cubic, tetrahedral, octahedral, dodecahedral, and icosahedron three-dimensional geometric shapes in order to be almost fully compatible with the shape of the digital model (3) to form the digital model (3) using multiple unit design cells (5). (FIG. 3).

In an embodiment of the invention, the processor unit (4) enables the determination of the mechanical and thermal stresses to be applied to the digital model (3) designed by numerical analyses and the removal of unit design cells (5) in regions where these stresses have not reached the appropriate threshold values previously determined by the user in accordance with the stress and pressure distribution according to the simulations and analyzes performed.

In an embodiment of the invention, the processor unit (4) enables the determination of powder parameters, laser orientation angle and intensity, electron gun power or beam directions in order for the part (p) to be produced in the device (2) in the most proper manner.

In an embodiment of the invention, the processor unit (4) by which the design, analysis and production parameters are determined and which plays a role during the stages of creating the digital model (3) and transforming it into a part (p), is located on the device (2).

The invention claimed is:

1. An optimization system (1) comprising a device (2) that enables the production of parts (p) by additive manufacturing, a digital model (3) that enables part (p) analysis and/or design to be made in a virtual environment and creates a three-dimensional virtual part (p) model, a processor unit (4) that enables the designing of the digital model (3), wherein the device (2) performs part (p) production under the control of the processor unit (4), multiple unit design cells (5) which are used as building blocks to create the digital model (3) are virtually designed in the processor unit (4), and each have a three-dimensional platonic geometric shape, at least one database (6) in which analysis and/or design data are stored, said database (6) comprises test data obtained by subjecting multiple parts (p) produced in the device (2) to chemical, physical, geometric and mechanical tests, and the processor unit (4) that enables the creation of the digital model (3) by arranging the unit design cells (5) using the test data from the database (6), wherein said processor unit (4) determines the platonic geometric shape of the unit design cell (5) depending on the data it retrieves from the database (6).

2. The optimization system (1) according to claim 1 above, characterized by the processor unit (4) that enables the determination of the chemical and/or physical tests to be applied to the part (p).

3. The optimization system (1) according to claim 1, characterized by the processor unit (4) that identifies the difference between the part's (p) analysis results using the physical and chemical test data applied to the user-produced part (p) and depending on the defined differences, that enables the creation of the digital model (3) by machine learning method.

4. The optimization system (1) according to claim 1, characterized by the processor unit (4) that compares the analysis data of each unit design cell (5) to the chemical and/or physical test data of the part (p) in the database (6)

and enables the creation of the digital model (3) by selecting and arranging the unit design cell (5) by machine learning method.

5. The optimization system (1) according to claim 1, characterized by the processor unit (4) that enables the digital model (3) to be user-designed for part (p) designing and is programmable for the design and analysis of the digital model (3).

6. The optimization system (1) according to claim 1, characterized by the unit design cell (5) that has cubic, tetrahedral, octahedral, dodecahedral or icosahedron three-dimensional geometric shape.

7. The optimization system (1) according to claim 1, characterized by the processor unit (4) that determines the mechanical and thermal stresses to be applied to the digital model (3) designed by numerical analysis, applies them to the digital model (3) and by removing those regions from the digital model (3) where the stress does not reach the previously user-determined threshold value according to the stress and pressure distribution obtained as a result of the analysis performed on the digital model (3), makes the structure of the part (p) to be produced more lightweight.

8. The optimization system (1) according to claim 1, characterized by the processor unit (4) that determines at least one of the production parameters such as powder melting parameters, laser directing angle, applied laser power, electron gun power or beam directions used by the device (2) in part (p) production.

9. The optimization system (1) according to claim 1, characterized by the processor unit (4) located on the device (2).

* * * * *